(12) United States Patent
Dufty

(10) Patent No.: US 6,840,543 B2
(45) Date of Patent: Jan. 11, 2005

(54) TRAILER

(75) Inventor: Raymond Jeffrey Dufty, Ernest (AU)

(73) Assignee: Forestfield PTY Ltd., Queensland (AU)

( * ) Notice: Subject to any disclaimer, the term of this patent is extended or adjusted under 35 U.S.C. 154(b) by 26 days.

(21) Appl. No.: 10/034,161

(22) Filed: Dec. 26, 2001

(65) Prior Publication Data

US 2002/0109345 A1 Aug. 15, 2002

(30) Foreign Application Priority Data

Feb. 2, 2001 (AU) ............................................... PR2857
May 2, 2001 (AU) ............................................... PR4707

(51) Int. Cl.$^7$ ................................................. B60P 1/04
(52) U.S. Cl. ..................................... 280/789; 414/485
(58) Field of Search ............................... 280/408, 638, 280/639, 35, 656, 789; 414/482, 485

(56) References Cited

U.S. PATENT DOCUMENTS

| | | | |
|---|---|---|---|
| 3,764,031 A | * 10/1973 | Parsen | ........................ 414/485 |
| 3,979,137 A | 9/1976 | Lipscomb, Jr. et al. | |
| 4,051,967 A | 10/1977 | Sedgwick et al. | |
| 4,813,841 A | * 3/1989 | Eischen | ........................ 414/485 |
| 5,090,718 A | 2/1992 | Kauffman | |
| 5,362,195 A | * 11/1994 | Wagner | ........................ 280/789 |
| 5,411,284 A | * 5/1995 | Harbin | ........................ 280/656 |
| 5,564,883 A | 10/1996 | Swanner | |

FOREIGN PATENT DOCUMENTS

| | | |
|---|---|---|
| CA | 1196044 | 10/1985 |
| CA | 2226280 | 7/1999 |

* cited by examiner

*Primary Examiner*—Lesley D. Morris
*Assistant Examiner*—Matthew Luby
(74) *Attorney, Agent, or Firm*—Hudak, Shunk & Farine Co. LPA

(57) ABSTRACT

There is provided a trailer (65) having a trailer frame (68) supported by ground engaging wheels (84). A pivot frame (69) is pivotally attached to the trailer frame (68) by pivot attachment means (72). The pivot frame (69) is attachable to maintenance apparatus such as a mower (100) in use. There is also provided connection means such as a drawbar (70) to a prime mover.

13 Claims, 10 Drawing Sheets

TRAILER

FIELD OF THE INVENTION

This Invention relates to a trailer attachable to maintenance machines or apparatus and in particular turf maintenance apparatus inclusive of mowers, rollers, aerating machines, compacting machines and the like. The invention has particular, although not exclusive, application to turf or grass mowers.

BACKGROUND OF THE INVENTION

Hitherto grass mowers or cutters when used in grass cutting locations such as nature strips, golfing greens, fairways of golf courses, bowling greens, grass tennis courts and the like, were transported from one location to another by a standard box trailer attached to a prime mover such as a utility vehicle or pick up truck, four wheel drive vehicle or normal sedan. It was usually necessary to manually lift the mower off the trailer or use a ramp plate to wheel the mower on and off the trailer. This practice was found to be time consuming and labour intensive, but despite these drawbacks has now achieved widespread use.

One particular disadvantage of this conventional practice was that often the clearance between the bed knife or fixed knife of a lawn mower and the movable blades attached to a cutting head or reel of the mower was varied from one location to another because of the tendency of the bed knife to contact the floor of the trailer when the mower was being transported. This often meant that the grass at different locations was cut at different heights unless appropriate adjustment was carried out. This practice was also time consuming and inefficient.

SUMMARY OF THE INVENTION

It is an object of the invention to provide a trailer for attachment to maintenance apparatus which enables the maintenance apparatus to be elevated above the ground avoiding contact with a cutting head when being transported.

The trailer of the invention includes:

(i) a trailer frame supported by ground engaging wheels;
(ii) a pivot frame pivotally attached to the trailer frame by pivot attachment means which pivot frame is attachable to maintenance apparatus in use; and
(iii) connection means to a prime mover.

The pivot frame is preferably U shaped, although this is not necessary and the frame may adopt other shapes such as being H shaped or V shaped or even being rectangular or triangular. However a U shape is preferable for convenience.

The trailer frame may have the same configuration as the pivot frame and thus may have a number of shapes as described for the pivot frame. Preferably however the pivot frame is U shaped.

The pivotal attachment means, between the trailer frame and the pivot frame, may comprise a single pivot joint or more preferably a pair of pivot joints which are suitably in opposed relationship. Such pivot joints may comprise hinge joints, pivot sleeves, or adopt a pivot pin interconnecting two frame members. Most preferably use is made of a pivot sleeve using one bush or a pair of bushes as is considered appropriate.

The connection means between the trailer and the prime mover may be provided by a drawbar interconnecting the trailer frame and the prime mover. The drawbar may be integral with or rigidly attached to the trailer frame.

Maintenance apparatus to which the trailer of the invention is attached may comprise any apparatus suitable for maintenance of grass or turf or for shifting soil such as rotary hoes and the like. Turf maintenance apparatus such as lawn mowers, lawn rollers, turf aerators or compactors may be used as discussed above.

The pivot frame may be attached to the maintenance apparatus in any suitable manner. Preferably in a transportation mode, the pivot frame will normally overlie the trailer frame and be in abutment with the trailer frame. However, in a loading mode, the pivot frame may be pivoted upwardly, relative to the stationary trailer frame to facilitate attachment to the maintenance apparatus.

The attachment means between the pivot frame and the maintenance apparatus may be of any suitable type and preferably fixedly engages the maintenance apparatus so that upon pivotal movement of the pivot frame relative to the trailer frame, the maintenance apparatus is elevated clear of the ground with a substantial part of the maintenance apparatus avoiding contact with the trailer.

Thus, in one form, the attachment means may comprise a single rigid coupling between the pivot frame and the maintenance apparatus but more preferably there is provided a pair of opposed rigid couplings between the pivot frame and the maintenance apparatus. These may be of a male-female interaction and in one form the pivot frame may be provided with a pair of opposed sockets channels or notches for engagement with corresponding projections of the maintenance apparatus. Most preferably these projections may comprise outwardly extending axle ends or stub axles of a drive roller or wheel axle of the maintenance apparatus.

There also may be provided fluid actuated means which interconnects the pivot frame and the trailer frame, which inhibits sudden upward pivotal movement of the pivot frame relative to the trailer frame and which also assist in gentle lowering of the maintenance apparatus for unloading purposes when required. Thus, the provision of the fluid actuated means is a safety feature and thus may comprise a hydraulic ram assembly or a pneumatic ram assembly such as a gas strut.

BRIEF DESCRIPTION OF THE DRAWINGS

Reference to a preferred embodiment of the invention may be shown in the attached drawings wherein.

DETAILED DESCRIPTION OF THE DRAWINGS

Figure 1:
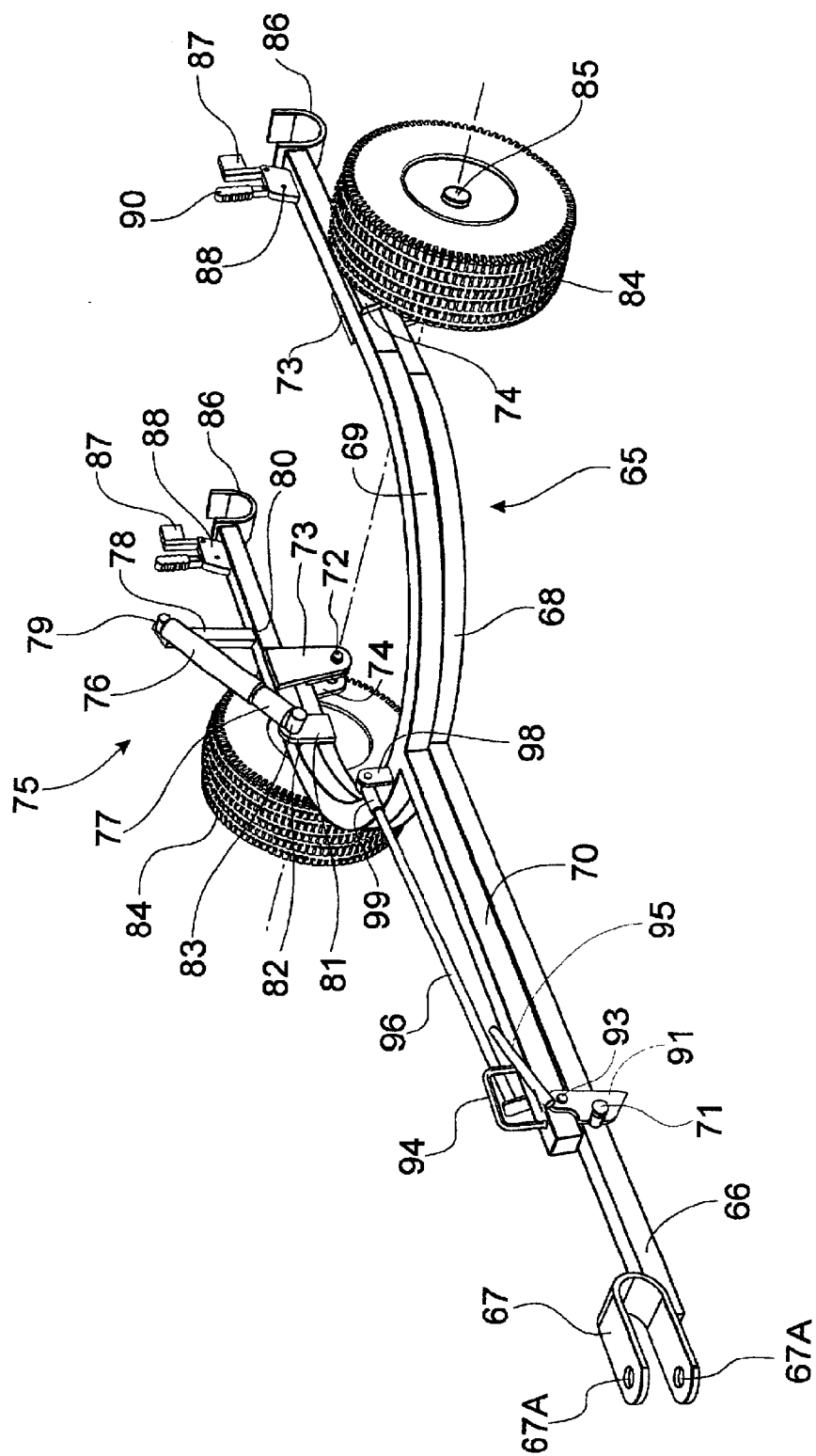
FIG. 1 is a perspective view of a trailer assembly constructed in accordance with this embodiment of the invention with the pivot frame in the lowered or transportation position.

In FIG. 1 reference is made to a trailer 65 which includes a drawbar 66, hitch connection 67 having hitch apertures 67A, trailer frame 68 and pivot frame 69. Pivot frame 69 has connection arm 70 for attachment to drawbar 66 at projection 71. Pivot frame 69 is pivotally attached to trailer frame 68 by pivot pins 72 which extend through opposed brackets 73 and 74. Bracket 73 is welded or otherwise rigidly attached to pivot frame 69 and bracket 74 is welded or otherwise rigidly attached to trailer frame 68. In the inoperative position shown in FIG. 1, pivot frame 69 lies adjacent to or abutting trailer frame 68 and is located between opposed brackets 73 and 74 as illustrated. There is also provided a hydraulic ram assembly 75 having cylinder 76 and piston 77, wherein cylinder 76 is pivotally attached at 79 to support rod 78 welded or otherwise rigidly attached to pivot frame 69 at 80. There is also provided support plate 81 welded to trailer frame 68 at 82 and which has pivot joint 83 interconnecting piston 77 and support plate 81.

Trailer frame 68 also has ground engaging wheels 84 rotatably attached thereto by stub axles 85. At the rear or free ends of pivot frame 69 is provided mower supports 86 as well as retaining member 87 pivotally attached to support bracket 88 at 89 and operating lever 90 for controlling movement of retaining member 87.

Figure 2:
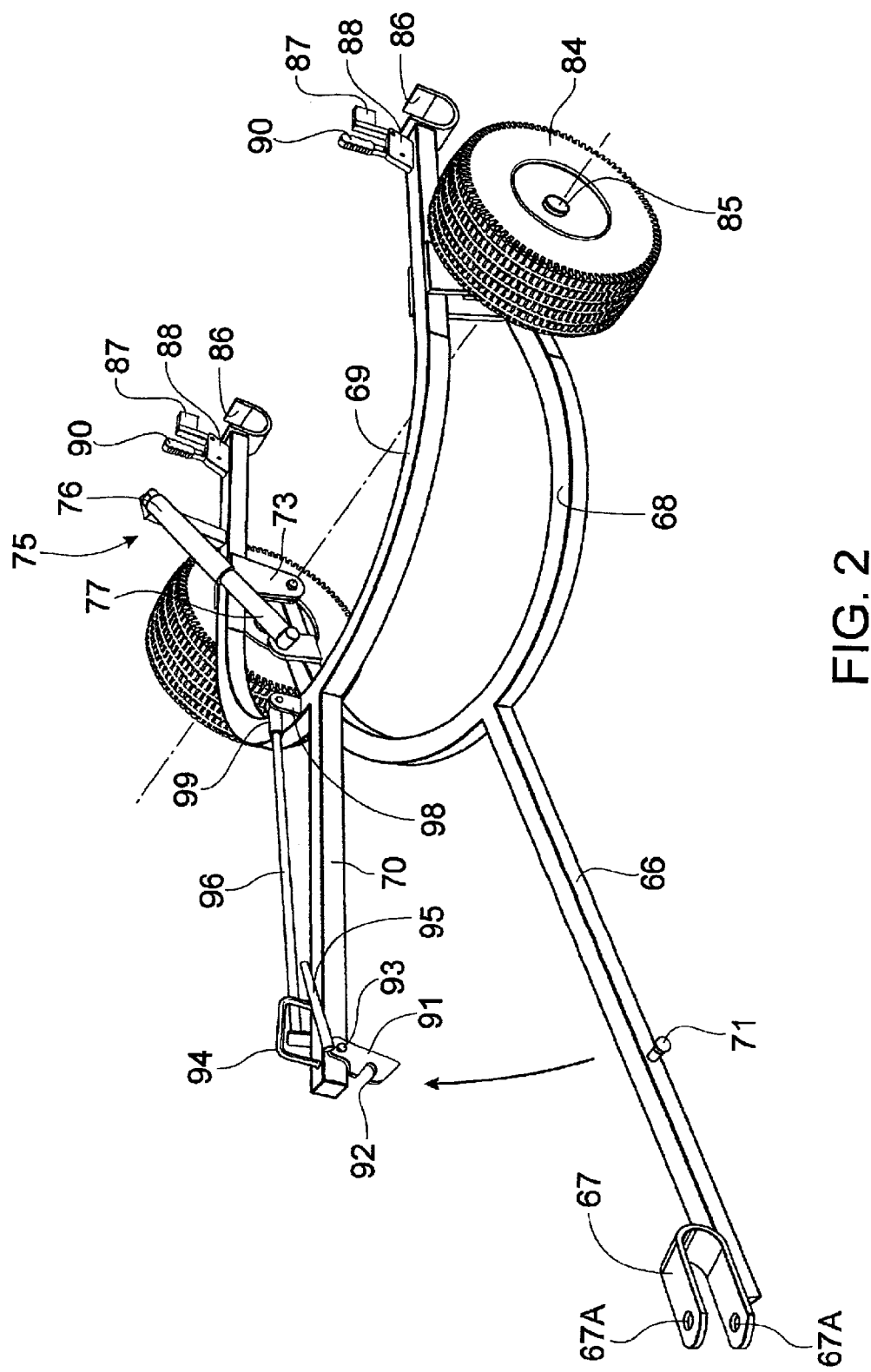
FIG. 2 is a similar view to FIG. 1 showing the pivot frame in an elevated or loading position relative to the trailer frame.

Connection arm 70 also has securing plate 91, which has notch 92, best shown in FIG. 2, which engages with projection 71 as shown in the position in FIG. 1. Plate 91 is pivotally attached to connection arm 70 at 93. Connection arm 70 also has handle 94. Plate 91 is held by a latch arm 95 which has a spring (not shown) which biasses plate 91 to the locked position shown in FIG. 1. Connection arm 70 also has a mower support arm 96 which has an outer retainer notch 97 best shown in FIG. 4. The support arm 96 is pivotally attached to pivot plate 98 by pivot sleeve 99.

As shown in FIG. 2 pivot frame 69 may pivot upwardly relative to trailer frame 68 upon unlatching of securing plate 91 from locking projection 71.

Figure 3:
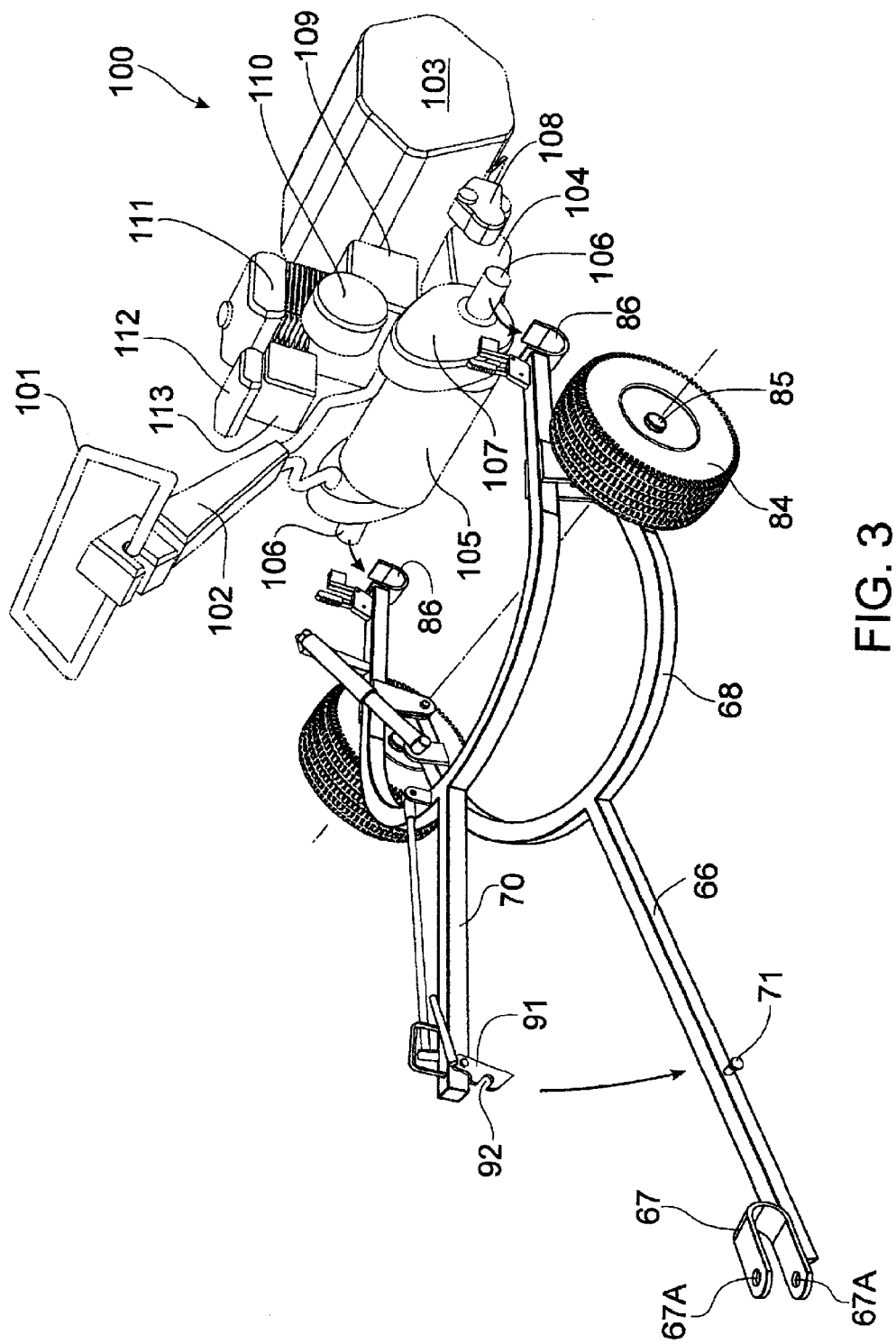
FIG. 3 is a similar view to FIG. 2 showing attachment of a mower to the pivot frame when in an elevated or loading position.

FIG. 3 refers to a mower 100 having handle 101, handle support arm 102, catcher 103, cutting head 104, drive roller 105, axle ends 106 each extending through an associated drive housing 107 for drive roller 105, cutting mechanism 108, engine 109, gearbox 110 and fuel tank 111, filter 112 and carburettor 113. As shown by the arrows in full outline, axle ends 106 each engage an associated mower support 86 which is in the form of a support notch or channel. As shown in FIG. 3 each axle end 106 engages with an adjacent support 86 upon upward movement of the pivot frame 69 relative to trailer frame 68.

Figure 4:
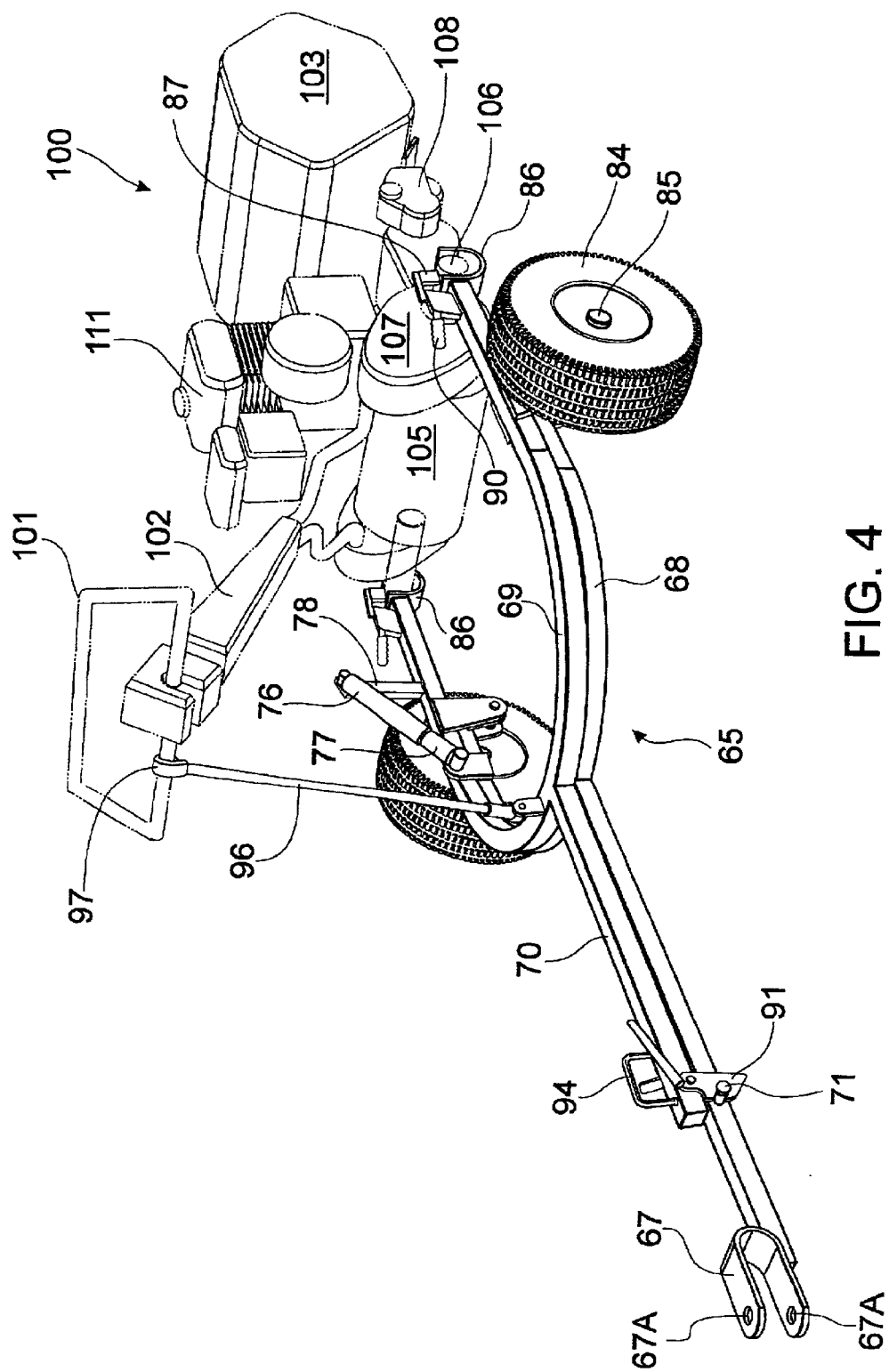
FIG. 4 is a view of the trailer assembly in a transportation position as shown in FIG. 1 with the mower elevated clear of the ground.

Subsequently, as shown in FIG. 4, pivot frame 69 may be pivoted to a lower position to therefore elevate mower 100 to a transportation position clear of the ground. As shown in FIG. 4 retainer notch 97 of support arm 96 engages with handle 101 to provide further support for mower 100 when in the transportation position. The provision of hydraulic ram assembly 75 enables the mower 100 to be lowered gently to the ground and is also a safety feature in preventing upward movement of pivot frame 69 relative to trailer frame 68.

Unloading of mower 100 is accomplished by pivotal upward movement of frame 69 relative to trailer frame to thereby cause mower 100 to be in the position shown in FIG. 3. Then pivot frame 69 may be pivoted downwardly to attain the position shown in FIG. 1.

Figure 6:
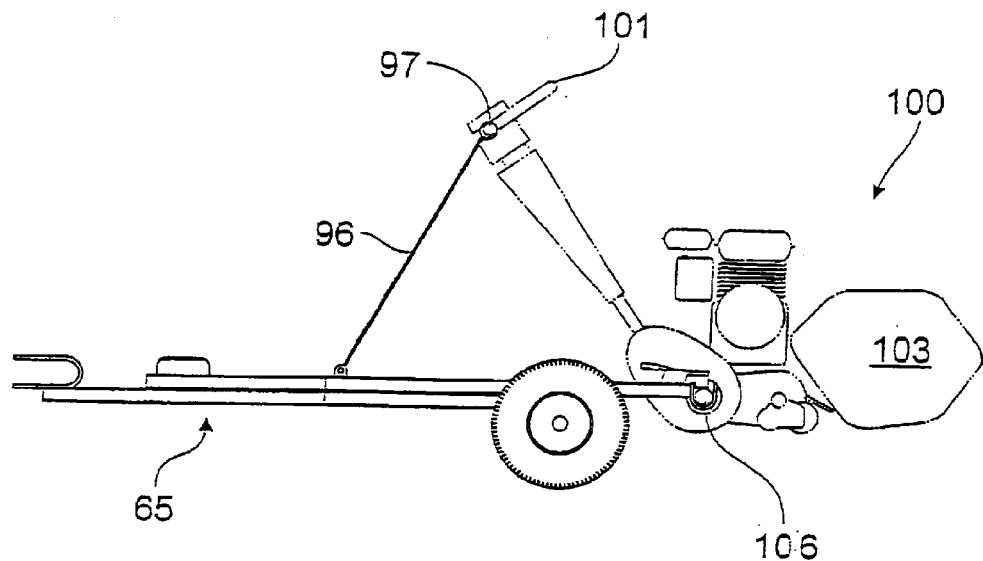
FIG. 6 is a side elevation of the trailer assembly of FIG. 4.
Figure 5:
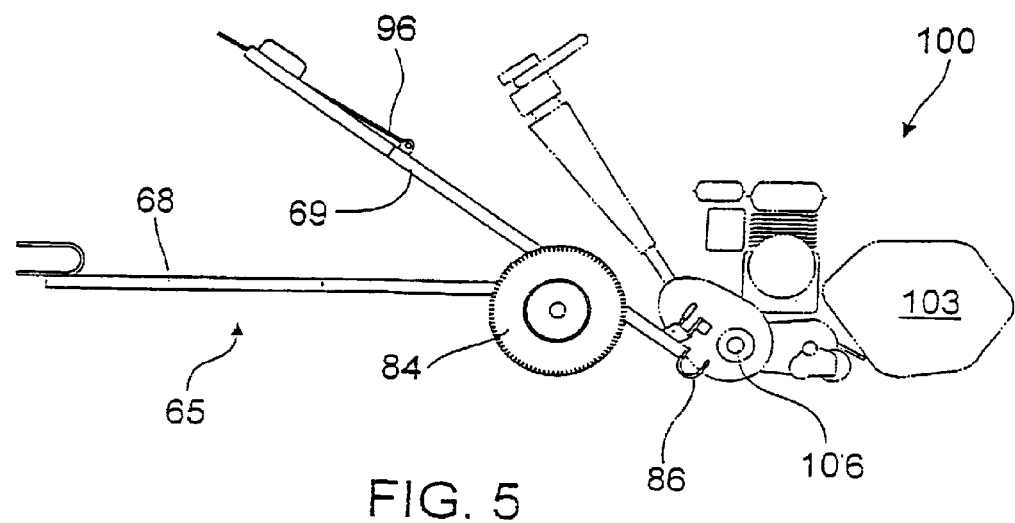
FIG. 5 is a side elevation of the trailer assembly of FIG. 3.

FIGS. 5–6 are side elevations of the perspective views of the trailer 65 shown in FIGS. 3–4. FIG. 5 like FIG. 3 shows elevation of pivot frame 69 relative to trailer frame 68, whereby mower support 86 is engageable with axle end 106 when mower 100 is resting on the ground. FIG. 6 shows axle ends 106 securely retained in mower supports 86 when it has been elevated clear of the ground in a transportation mode. There is also shown support arm 96 firmly supporting handle 101 of mower 100. This is also shower in FIG. 4 with retainer notch 97 of support arm 96 engaging handle 101. There is also shown retaining member 87 which has now been moved by operating lever 90 from an inoperative position shown in FIGS. 3 and 5 to the operative position retaining axle ends 106 in support member 86.

Figure 7:
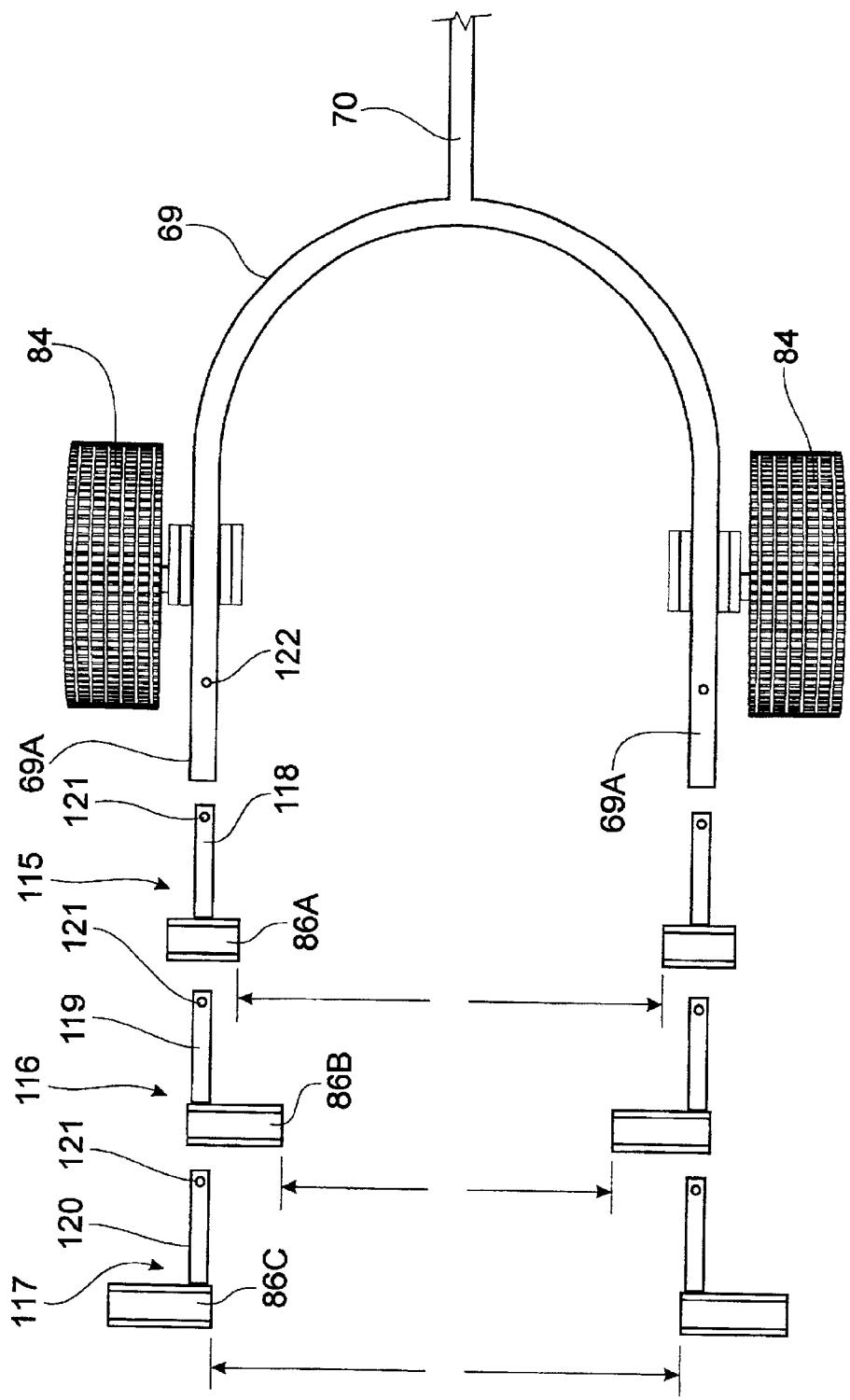
FIG. 7 is a plan view showing attachment of different mower support assemblies to the pivot frame to cater for mowers having different widths.

FIG. 7 shows attachment of different mower support assemblies to pivot frame 69. Thus there are shown support assemblies 115, 116 and 117 comprising retainer notches 86A, 86B and 86C to cater for mowers of different widths (i.e. length of the cutting head and associated axles). Each retainer notch 86A, 86B or 86C has a connection arm 118, 119 and 120, each adapted for telescopic engagement with an adjacent tubular open end 69A of pivot frame 69. There are also shown attachment apertures 121 and 122 which when aligned with each other are engaged by a suitable fastener (not shown).

It will be appreciated from the preferred embodiment that no trailer contact is made with the reel and bed knife of the mower 100, because the mower is transported substantially without any part of the mower coming into contact with trailer 65.

Figure 8:
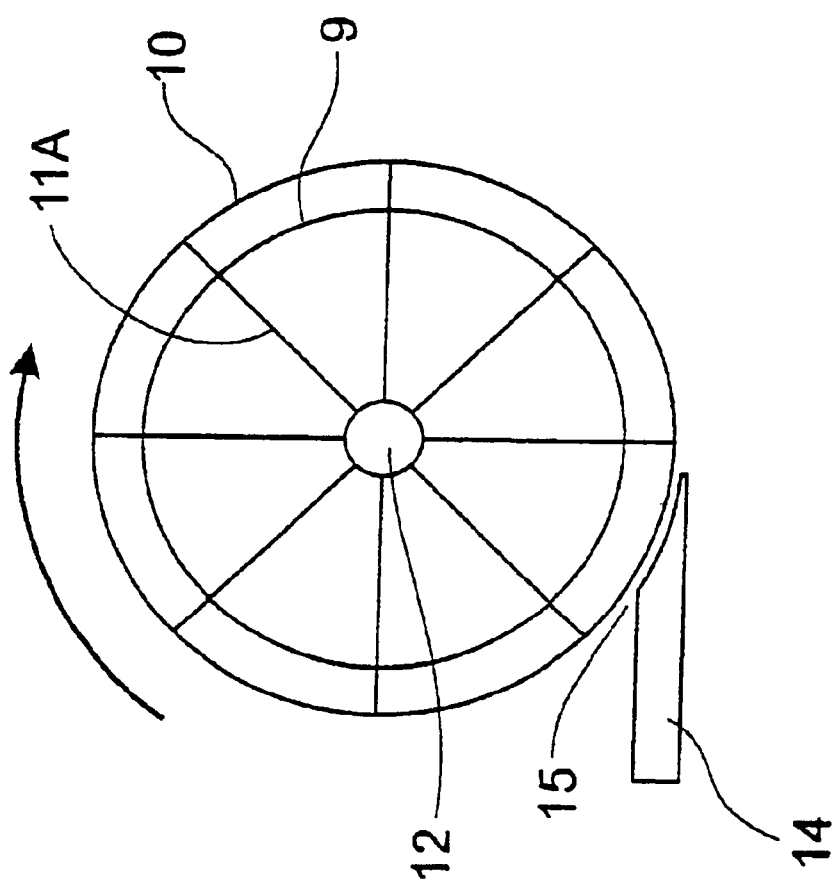
FIG. 8 is a schematic view illustrating a disadvantage of the prior art.

This disadvantage of the prior art is shown in FIG. 8, wherein the cutting reel or head 10 of a conventional mower 11 shown in FIG. 8 is rotatable in the direction marked with an arrow. The reel 10 is mounted to axle 12. The reel 10 is provided with spiral blades 11A and there is also provided a cylindrical tube 9 to which cutting blades 11A are attached. There is also provided a bed knife or fixed knife 14 and a clearance 15 between the bed knife 14 and cutting blades 11A. The clearance 15 is relatively narrow and such clearance will alter if the mower 11 is transported in a conventional flat bed trailer because of the bed knife 14 being in contact with the floor of the trailer. This is avoided by the adoption of the trailer of the present invention which elevates the mower 11 off the ground with cutting head 10 clear from the trailer frame when being transported.

Figure 9:
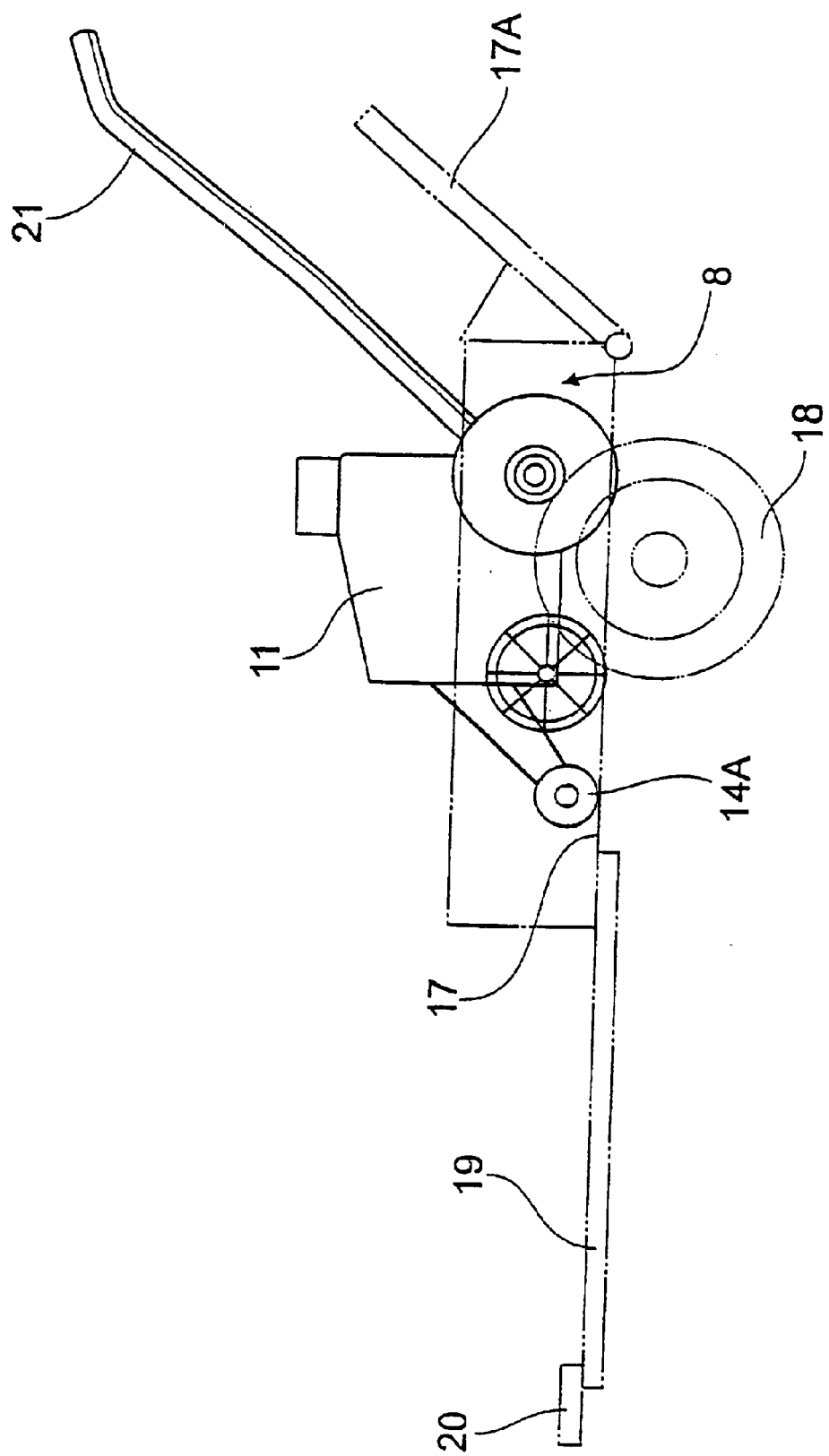
FIG. 9 is a view of the prior art which incorporates the apparatus shown in FIG. 8.

Reference to another advantage is shown in FIG. 9 which shows mower 11 having handle 21 being carried by a standard flat bed or box trailer 8 which has a ramp 17A for removal of mower 11 from trailer 8 when required. The trailer 8 is provided with ground supporting wheels 18 and may be attached to a prime mower (not shown) by drawbar assembly 19 and hitch 20. In this arrangement the bed knife 14 normally contacts floor 17 and thus clearance 15 may be altered or varied as discussed above which has undesirable consequences. The height of the bed knife 14 is adjusted by adjustment roller 14A and such adjustment can be altered undesirably by contact of roller 14A with floor 17. It will also be appreciated that loading and unloading of mower 11 off trailer 8 is time consuming and labour intensive and this is avoided by the use of a trailer constructed in accordance with the invention. Other advantages obtained by the trailer of the invention when compared to the prior art shown in FIG. 9 includes the following:

(i) loading or unloading of the mower may occur when trailer 65 is hitched to the prime mover;

(ii) less storage room is required;

(iii) travelling time between work locations is reduced;

(iv) a more consistent cutting height is achieved in relation to turf locations such as golfing greens;

(v) the trailer of the invention is simple in construction, light weight and effective in use.

It will also be appreciated that often it is desired to transport mowers or other maintenance apparatus with the wheels removed for convenience and the trailer of the invention may accommodate this objective by retention of axle ends 106 in mower supports 86. However, this is not essential and the trailer of the invention is adapted for transport of a mower having the wheels attached.

Figure 10:
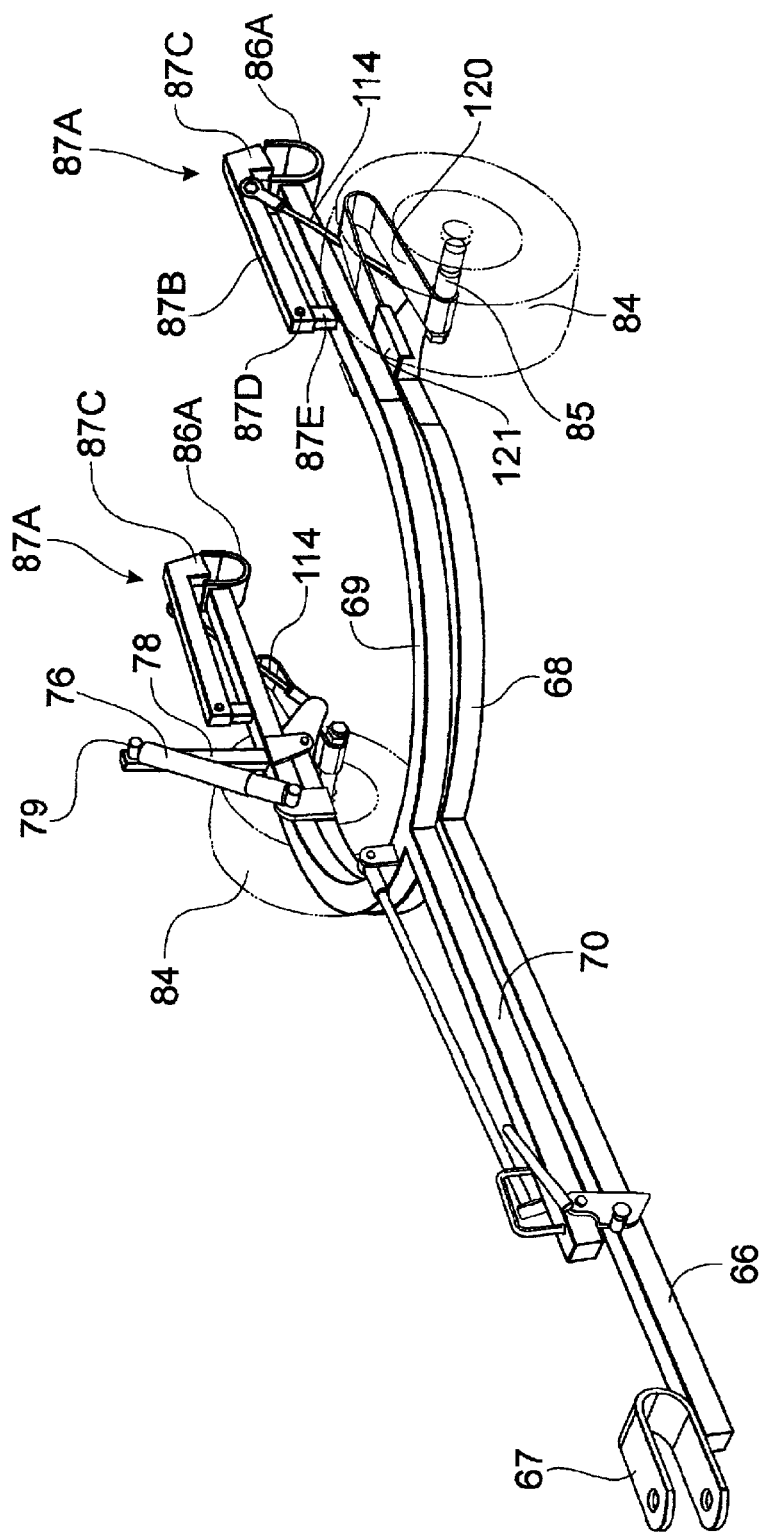
FIG. 10 is a perspective view of another embodiment of the trailer of the invention.

In FIG. 10 there is shown a further trailer similar to the trailer shown in FIGS. 1–7 with the exception that retaining members 87, support brackets 88 and operating levers 90 have now been omitted and replaced by automatic clamping mechanism 87A at each side of pivot frame 69, which includes clamping arm 87B and clamping protrusion 87C wherein clamping arm 87B is pivotally attached at 87D to abutment 87E attached to pivot frame 69. There is also provided a linkage rod 114 which is adjustable at each end 115 and 116 and pivotally attached to bracket 117 at 118 and also to clamping arm 87B at 119 as shown. There is also provided a leaf spring 120 which engages with L shaped retaining member 121 of each bracket 117 at a top end thereof. Leaf spring 120 also includes a bottom end 122 wound around stub axles 85 of wheels 84 which are shown in phantom.

Figure 11:
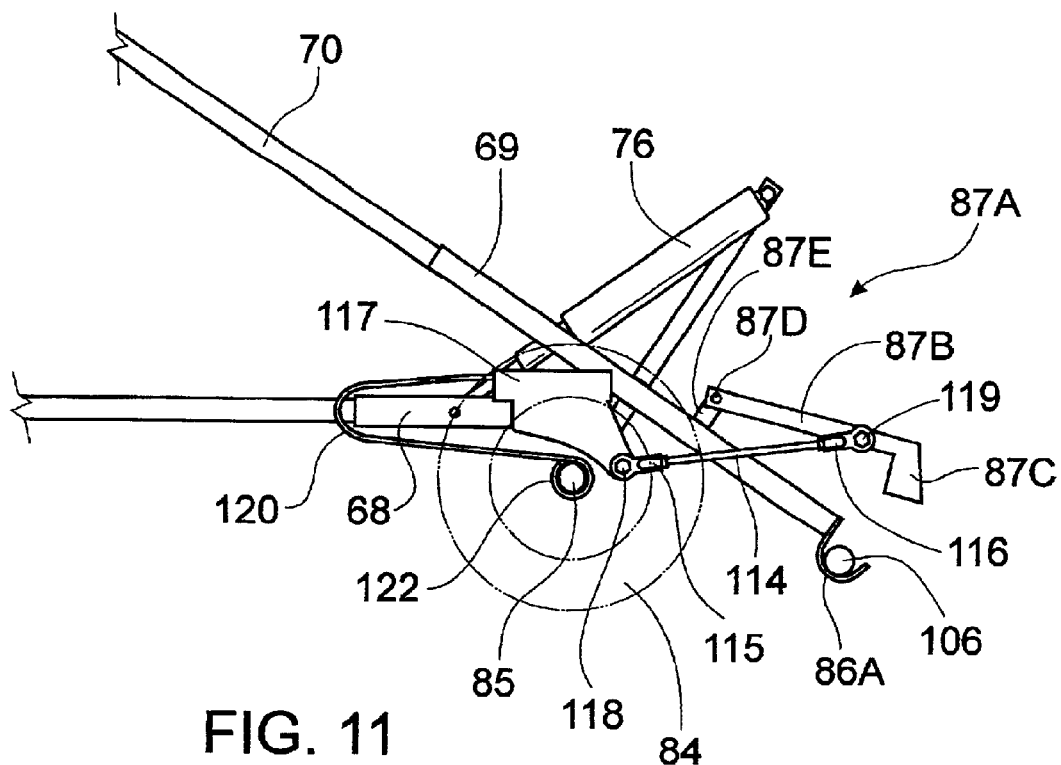
FIG. 11 is a side view of the trailer shown in FIG. 10 showing the pivot frame in an elevated or transportation position relative to the trailer frame.
Figure 12:
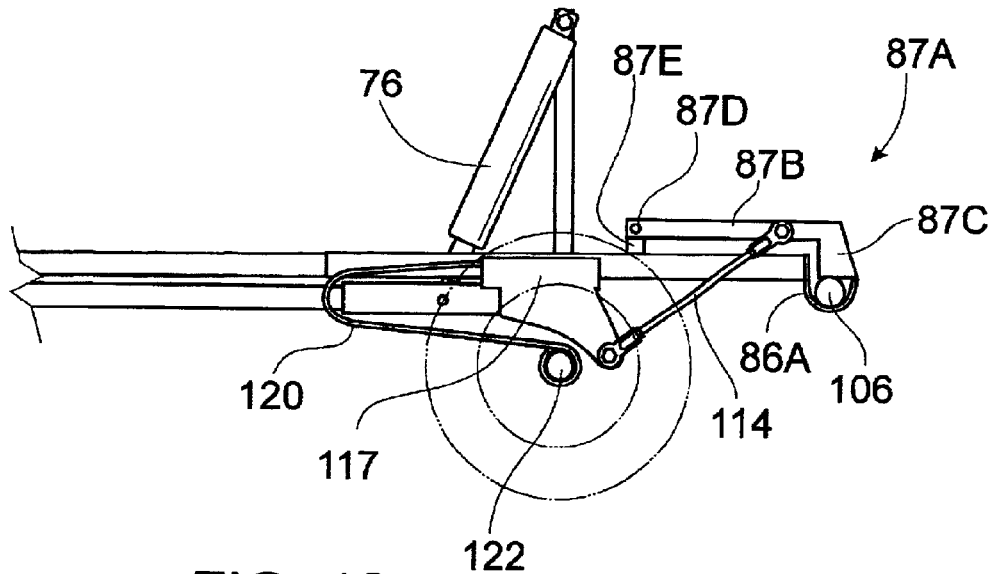
FIG. 12 is a side view of the trailer shown in FIG. 10 showing the pivot frame in a lowered or transportation position relative to the trailer frame.

As shown in FIGS. 11–12, the provision of clamping mechanism 87A is preferable to the use of the manual operation of retaining member 87 and operating levers 90 because clamping protrusion 87C automatically engages with supports 86A in a lowered position to retain mower axle 106 in place and thus clamping of the mower 100 in position on pivot frame 69 is facilitated.

Also the provision of leaf springs 120 cushion the ride of the mower 100 when in the transportation position shown in FIG. 12 and the provision of linkage rods 114 and retaining brackets 117 provide a suitable anchoring point for clamping arms 87B and facilitate pivotal movement thereof.

It will also be appreciated that the trailer of the invention may be adapted to carry a plurality of mowers (e.g. a pair of mowers) instead of the single mower which is shown in the preferred embodiment shown in the drawings.

What is claimed is:

1. A trailer including:
   (i) a trailer frame having a front end and a rear end supported by ground engaging wheels;
   (ii) a pivot frame pivotally attached to the trailer frame by pivot attachment means wherein the pivot frame is adapted to be attached to a maintenance apparatus in use;
   (iii) connection means to a prime mover; and
   (iv) fluid actuated means between the pivot frame and the trailer frame, wherein an upper end of the fluid actuated means is pivotally attached to the pivot frame at a location above the pivot frame, and wherein a lower end of the fluid actuated means is pivotally attached to the trailer frame intermediate the front end and rear end.

2. A trailer as claimed in claim 1 wherein the trailer frame is U-shaped.

3. A trailer as claimed in claim 1 wherein the pivot frame is U-shaped.

4. A trailer as claimed in claim 1 wherein the pivot attachment means comprises a pair of pivot joints in opposed relationship.

5. A trailer as claimed in claim 1 wherein the connection means comprises a drawbar interconnecting the trailer frame and the prime mover in use.

6. A trailer as claimed in claim 1 wherein the pivot frame overlies the trailer frame in transportation mode and is in abutment with the trailer frame.

7. A trailer as claimed in claim 6 wherein in a loading mode the pivot frame is pivotable upwardly relative to the trailer frame which is stationary to facilitate attachment to the maintenance apparatus.

8. A trailer as claimed in claim 1 wherein there is provided an upright support rod between the pivot frame and the upper end of the fluid actuated means.

9. A trailer as claimed in claim 1 wherein there is provided a support plate between the trailer frame and the lower end of the fluid actuated means whereby said lower end is located above the trailer frame.

10. A trailer as claimed in claim 1 wherein in a non-operational position the pivot frame overlies the trailer frame and the fluid actuated means is oriented obliquely to both the pivot frame and the trailer frame and inclined towards the rear end of the trailer frame so as to form an acute included angle between the fluid actuated means and a horizontal plane farmed by the trailer frame.

11. A trailer including:
   (i) a trailer frame having a front end and a rear end supported by ground engaging wheels;
   (ii) a pivot frame pivotally attached to the trailer frame by pivot attachment means wherein the pivot frame is adapted to be attached to a maintenance apparatus in use;
   (iii) connection means to a prime mover; and
   (iv) fluid actuated means between the pivot frame and the trailer frame, wherein an upper end of the fluid actuated means is pivotally attached to an upright support and attached to the pivot frame so that the upper end is located above the pivot frame, wherein another end of the fluid actuated means is pivotally attached to the trailer frame intermediate the front end and rear ends, and wherein in a non-operational position the pivot frame overlies the trailer frame and the fluid actuated means is oriented obliquely to both the pivot frame and the trailer frame and inclined towards the rear end of the trailer frame so as to form an acute included angle between the fluid actuated means and a plane formed by the trailer frame.

12. A trailer-maintenance apparatus combination including:
   (i) a trailer frame supported by ground engaging wheels;
   (ii) a pivot frame pivotally attached to the trailer frame by pivot attachment means;
   (iii) a maintenance apparatus supported by said pivot frame;
   (iv) attachment means between the maintenance apparatus and the pivot frame which comprises a pair of opposed rigid couplings in the form of a pair of sockets, channels or notches on the pivot frame which are engaged with corresponding projections on the maintenance apparatus comprising outwardly extending axle ends or stub axles of a drive roller or wheel axle of the maintenance apparatus so that upon pivotal movement of the pivot frame relative to the trailer frame the maintenance apparatus is elevated clear of the ground with a substantial part of the maintenance apparatus clear of the pivot frame.

13. A trailer-maintenance apparatus combination including:

(i) a trailer supported by ground engaging wheels;

(ii) a maintenance apparatus supported by said trailer;

(iii) attachment means between the maintenance apparatus and the trailer which comprises a pair of opposed rigid couplings in the form of a pair of sockets, channels or notches on the trailer which are engaged with corresponding projections on the maintenance apparatus, said projections comprising outwardly extending axle ends or stub axles of a drive roller or wheel axle of the maintenance apparatus so that upon pivotal movement of the trailer the maintenance apparatus is elevated clear of the ground.

\* \* \* \* \*